(12) United States Patent  (10) Patent No.: US 7,792,180 B2
Ichikawa  (45) Date of Patent: Sep. 7, 2010

(54) DATA TRANSMITTING/RECEIVING APPARATUS AND CONTROL METHOD THEREOF

(75) Inventor: Takeshi Ichikawa, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 864 days.

(21) Appl. No.: 11/700,837

(22) Filed: Feb. 1, 2007

(65) Prior Publication Data

US 2007/0195896 A1    Aug. 23, 2007

(30) Foreign Application Priority Data

Feb. 17, 2006  (JP)  .............................. 2006-040838

(51) Int. Cl.
*H04B 1/38*  (2006.01)
*H04L 23/00*  (2006.01)
(52) U.S. Cl. .......................... 375/219; 375/377; 455/73
(58) Field of Classification Search ................. 375/316, 375/295, 377, 362, 369, 219; 455/73, 130
See application file for complete search history.

(56) References Cited

U.S. PATENT DOCUMENTS

2006/0252448 A1 * 11/2006 Ichikawa ..................... 455/522

FOREIGN PATENT DOCUMENTS

JP          10-243041          9/1998

* cited by examiner

*Primary Examiner*—Tesfaldet Bocure
(74) *Attorney, Agent, or Firm*—Volentine & Whitt, P.L.L.C.

(57) ABSTRACT

A data transceiver that determines according to signal strength of a received radio wave whether a receiving operation should be continued. A measurement unit counts demodulation clocks of a demodulator and supplies a measurement result indicating instability of reception data until the count reaches a predetermined target count value, and supplies a measurement result indicating stability of the reception data after the count value is reached. A determinator receives the result of measurement indicative of instability, and outputs a determination result indicative of stopping a receiving operation regardless of signal strength. When the determinator receives the result of measurement indicative of stability, the determinator outputs a determination result corresponding to the signal strength of the reception data. Thus, receiving operation is advanced after reception data is sufficiently stable.

11 Claims, 6 Drawing Sheets

DATA TRANSMITTING/RECEIVING APPARATUS AND CONTROL METHOD THEREOF

BACKGROUND OF THE INVENTION

The present invention relates to a data transmitting/receiving apparatus such as a base station, a user terminal or the like which in a wireless network system, determines depending on a signal strength of a received radio wave whether a receiving operation should be continued, and a control method thereof.

A data transmitting/receiving apparatus has heretofore been equipped with a transmitter-receiver which receives data by radio via an antenna. The transmitter-receiver converts the received radio wave to analog data and performs demodulation processing thereon.

As such a transmitter-receiver, there is known one which detects a signal strength of reception data and determines based on the signal strength whether a received radio wave corresponds to the data to be received, thereby making it possible to determine whether a receiving operation should be continued or stopped, and which allows a comparing section in the transmitter-receiver to compare the data subsequent to demodulation processing with preset data where the received radio wave is found to correspond to the data to be received from the above result of determination, thereby allowing the comparing section to determine whether the data is destined for the present apparatus.

Meanwhile, in a burst signal demodulator described in a patent document 1 (Japanese Unexamined Patent Publication No. Hei 10(1998)-243041), a timer circuit thereof is capable of outputting a counter output based on a frame signal sent from a comparison circuit and demodulation clocks sent from the demodulator to the demodulator and a UW detector to thereby suppress fluctuations in demodulated data.

In the conventional data transmitting/receiving apparatus, however, a comparing section performs comparison processing on the reception data immediately when a transmitter-receiver accepts a receiving operation instruction from a control circuit. Thus, when there is a need to allow a predetermined time to elapse from the start of a receiving operation in order to obtain accurate demodulated data upon demodulation processing of the reception data, the demodulation processing might not be performed normally. Despite the data is destined for the present apparatus, the transmitter-receiver might recognize the data as being destined for other apparatus. Thus, when the transmitter-receiver misidentifies the reception data, a reception stop is required of the control circuit, so that the data transmitting/receiving apparatus cannot perform the receiving operation normally.

SUMMARY OF THE INVENTION

The present invention aims to provide a data transmitting/receiving apparatus which solves the drawbacks of such a prior art and which advances reception processing with respect to high reliable reception data and enhances the efficiency of a receiving operation, and a control method thereof.

According to one aspect of the present invention, for attaining the above object, there is provided a data transmitting/receiving apparatus comprising:

transmitting/receiving means for transmitting and receiving desired reception data and transmission data by radio waves; and control means for controlling transmission/reception of the reception data and the transmission data and performing reception processing on reception processing data based on the reception data, wherein the transmitting/receiving means includes determining means for determining based on a signal strength of the reception data whether a receiving operation should be continued or stopped and outputting a result of determination by the determining means, wherein the control means inputs the result of determination therein and controls the receiving operation so as to stop the receiving operation when the result of determination indicates a stop of the receiving operation, wherein the transmitting/receiving means includes measuring means for measuring a time required to make the reception data stable and outputting a result of measurement indicating stability of the reception data when the stable time elapses and indicating instability of the reception data when other than above, and wherein the determining means inputs the result of measurement therein and outputs the result of determination indicating a stop of the receiving operation regardless of the signal strength when the result of measurement indicates the instability of the reception data.

According to another aspect of the present invention, for attaining the above object, there is provided a method for controlling a data transmitting/receiving apparatus comprising a transmitting/receiving section for transmitting and receiving desired reception data and transmission data by radio waves, and a control section for controlling transmission/reception of the reception data and the transmission data and performing reception processing on reception processing data based on the reception data, the method comprising:

a determining step for causing the transmitting/receiving section to determine based on a signal strength of the reception data whether a receiving operation should be continued or stopped and to output a result of determination thereby;

a first step for inputting the result of determination to the control section and causing the control section to control the receiving operation in such a way as to stop the receiving operation when the result of determination indicates a stop of the receiving operation; and a measuring step for causing the transmitting/receiving section to measure a time required to make the reception data stable and to output a result of measurement indicating stability of the reception data when the stable time elapses and indicating instability of the reception data when other than above, wherein in the determining step, the result of measurement is inputted and the result of determination indicating a stop of the receiving operation is outputted regardless of the signal strength when the result of measurement indicates the instability of the reception data.

According to the data transmitting/receiving apparatus of the present invention, determination as to a signal strength and a comparison as to whether reception data is destined for the apparatus per se are effected on the reception data after a measurement unit in a transmitter-receiver counts demodulation clocks of a demodulator and the counted number of demodulation clocks reaches a predetermined target count value. Therefore, a receiving operation can be advanced even under any reception condition after a stable time for the reception data has elapsed sufficiently. Even though unexpected events of a signal strength, interference waves, etc. occur and the rise of the demodulator is delayed, uncapturing of the reception data can be prevented.

In the data transmitting/receiving apparatus of the present invention as well, a signal strength determinator of the measurement unit calculates a new target count value according to the signal strength, and a comparison circuit compares the counted number of demodulation clocks and the new target count value. Therefore, the present apparatus is capable of starting the receiving operation in a short period of time depending upon the rise of the demodulator, and processing reception data which is always stable.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Figure 1:
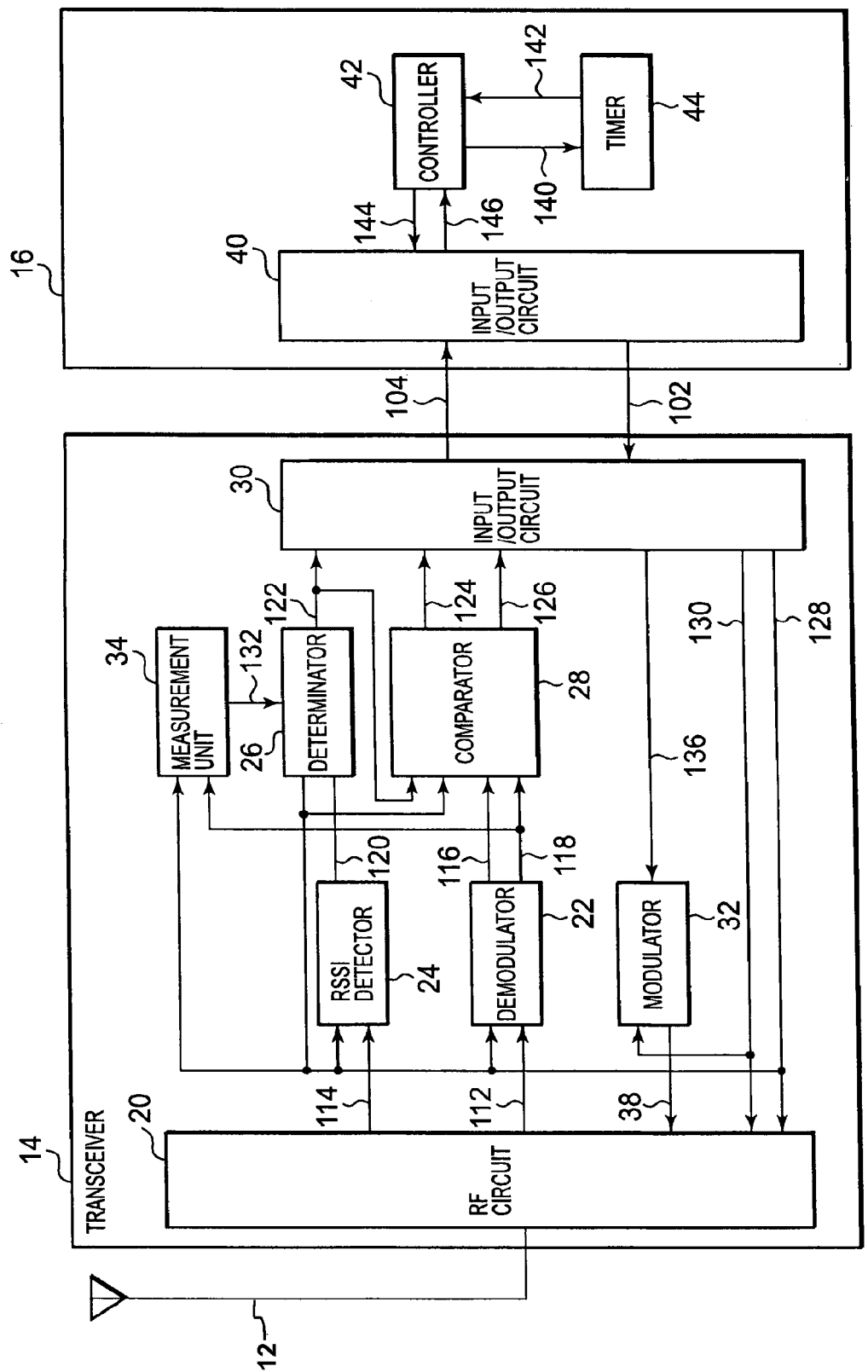
FIG. 1 is a block diagram showing one embodiment of a data transmitting/receiving apparatus according to the present invention.

A preferred embodiment of a data transmitting/receiving apparatus according to the present invention will next be explained in detail with reference to the accompanying drawings. As shown in FIG. 1, for example, a data transmitting/receiving apparatus 10 is configured including a transceiver or transmitter-receiver 14 that transmits/receives data by radio via an antenna 12, and a control circuit 16 that controls the transmission/reception of the data at the transmitter-receiver 14. Incidentally, sections directly unrelated to the understanding of the present invention are not shown and their redundant explanations are therefore avoided.

Figure 2:
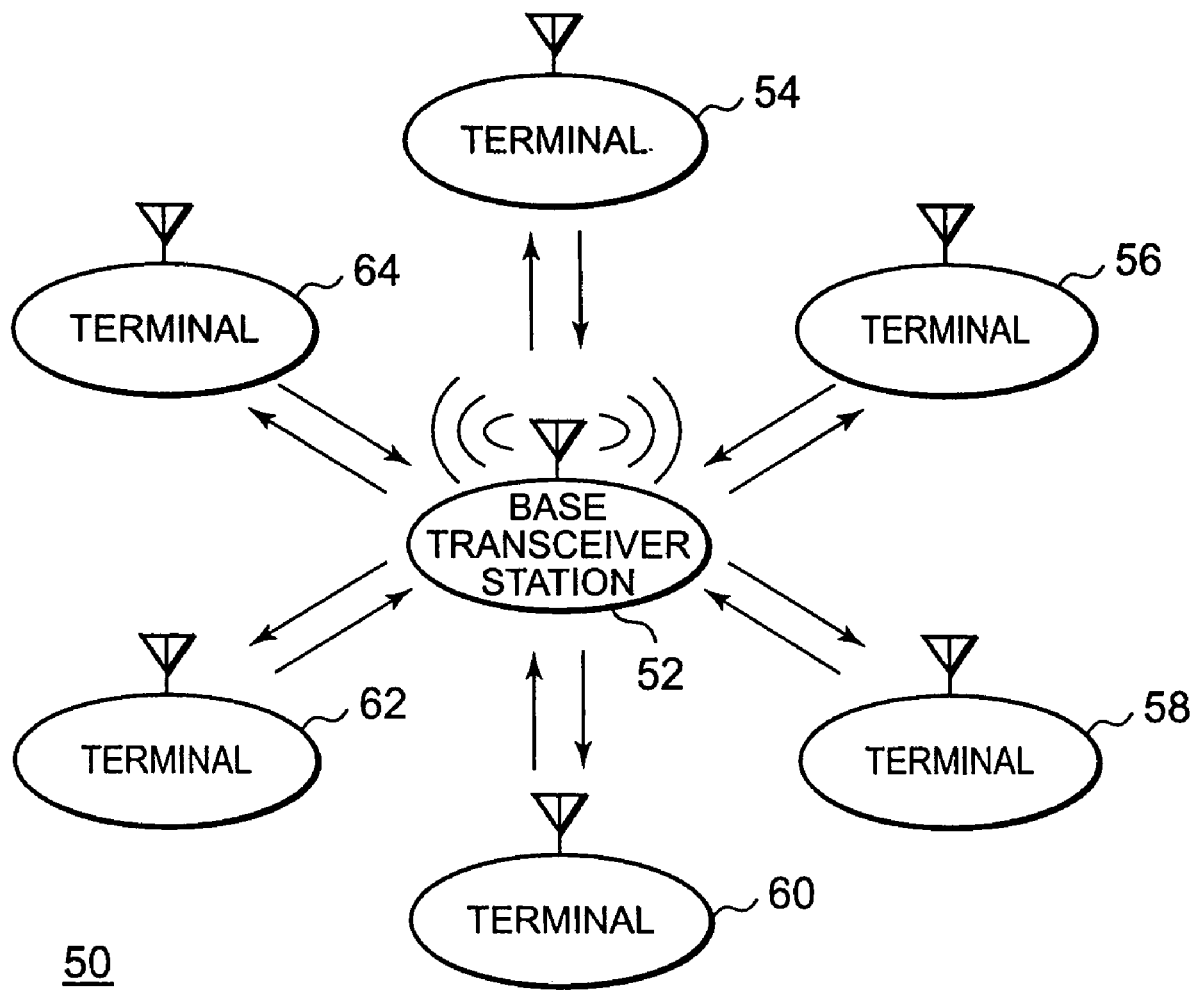
FIG. 2 is a schematic diagram of a wireless network system to which the data transmitting/receiving apparatus shown in FIG. 1 is applied.
Figure 3:
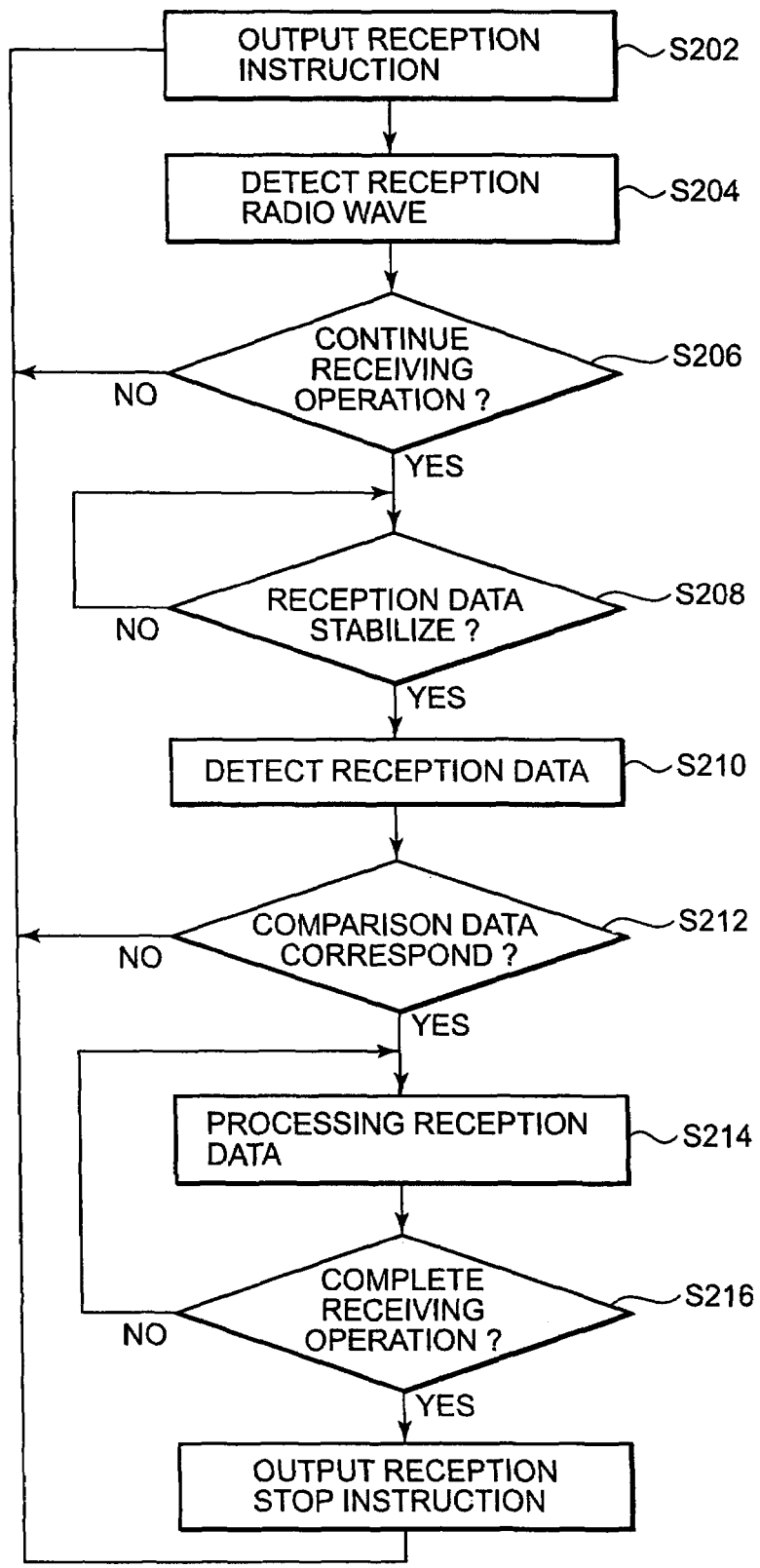
FIG. 3 is a flowchart for describing a procedure of operations of the data transmitting/receiving apparatus shown in FIG. 1.

As shown in FIG. 2, for example, the data transmitting/receiving apparatus 10 is applied to a wireless network system 50. The wireless network system 50 comprises a base station 52 that uses the data transmitting/receiving apparatus, and a plurality of user terminals 54, 56, 58, 60, 62 and 64 each of which makes use of the data transmitting/receiving apparatus. The base station and the user terminals are communicated with one another by transmitting/receiving desired data by radio. The data transmitting/receiving apparatus 10 may notify transmission data to the user terminals when applied to the base station and may notify the transmission data to the base station when applied to the user terminals.

Although a large number of base stations and user terminals can actually be contained in the wireless network system 50, only a base station and a small number of user terminals are illustrated in FIG. 2 to avoid an increase in complexity.

The transmitter-receiver 14 of the present embodiment, particularly, an RF (Radio Frequency) circuit 20 converts a received radio wave into analog reception data. Further, a demodulator 22 effects demodulating processing on the reception data, and a receiving signal strength indicator (RSSI) detector 24 detects a signal strength of the reception data. A determinator 26 determines or judges based on the signal strength whether the radio wave corresponds to a radio wave to be received. A comparison circuit 28 compares the reception data sent from the demodulator 22 with comparison data according to the result of determination by the determinator 26 and determines whether the radio wave is destined for the present apparatus.

The transmitter-receiver 14 of the present embodiment is configured including an input/output circuit 30 connected to the control circuit 16 via connecting lines 102 and 104 to mutually transmit digital data, and a modulator 32 which performs modulation processing on the transmitted digital data. The transmitter-receiver 14 supplies a control signal 128 for instructing the reception by the input/output circuit 30 or a control signal 130 for instructing the transmission by the input/output circuit 30 to each section in response to a control signal 102 for instructing the reception or transmission from the control circuit 16, and executes transmission/reception of a radio wave by being operated according to the control signal 128 or 130.

In the present embodiment, particularly, the transmitter-receiver 14 includes a measurement unit 34 which measures the time required to make stable the reception data. The determinator 26 makes effective the determination of the signal strength depending upon the result of measurement by the measurement unit 34 and can hence obtain the result of determination.

In the present embodiment, the RF circuit 20 is configured with being connected to the antenna 12. The RF circuit 20 receives therein a radio wave, e.g., a high-frequency RF signal received by the antenna 12 and performs analog conversion thereof to produce analog reception data 112 and 114, followed by supply of the reception data to the demodulator 22 and the RSSI detector 24 respectively. Further, the RF circuit 20 converts analog transmission data 38 obtained from the modulator 32 to such a radio wave and supplies the same to the antenna 12.

The demodulator 22 performs demodulation processing on the analog reception data 112 supplied from the RF circuit 20, and particularly in the present embodiment, performs analog-to-digital conversion thereof to produce digital reception data 116 and supplies the same to the comparison circuit 28. Further, the demodulator 22 may supply demodulation clocks 118 for allowing itself to operate to the comparison circuit 28 and the measurement unit 34.

The RSSI detector 24 detects an RSSI value, i.e., the signal strength of the reception data 114, based on the reception data 114 supplied from the RF circuit 20 and effects analog-to-digital conversion thereon, followed by supply of digital data 120 indicative of the RSSI value to the determinator 26.

The determinator 26 determines based on the signal strength 120 supplied from the RSSI detector 24 whether the receiving operation of the present apparatus 10 should be continued or stopped. Thereafter, the determinator 26 supplies the result of determination 122 indicative of the continuation or stop of its receiving operation to the comparison circuit 28 and notifies it to the control circuit 16 via the input/output circuit 30.

In the present embodiment, the determinator 26 analyzes the signal strength 120, e.g., compares the signal strength 120 with a predetermined threshold value set in advance. When the signal strength is less than the threshold value, the determinator 26 judges that the radio wave corresponding to the source of the signal strength 120 is not worthy of reception. That is, the determinator 26 determines that the corresponding radio wave does not correspond to the radio wave desired to be received by the present apparatus 10, and outputs the result of determination 122 indicative of the stop of the receiving operation. When the signal strength 120 is greater than the threshold value, the determinator 26 judges that the receiving operation should be continued, and outputs the result of determination 122 indicative of the continuation of the receiving operation.

In the present embodiment, particularly, the determinator 26 receives the result of measurement 132 from the measurement unit 34 and analyzes the signal strength 120 according to the result of measurement 132. When the result of measurement 132 indicates that the reception data is stable, for example, the determinator 26 determines that the demodulator 22 outputs high reliable reception data, and obtains the result of determination 122, based on the signal strength 120. When, however, the result of measurement 132 indicates that the reception data is unstable, the determinator 26 outputs the result of determination 122 indicative of stoppage in the receiving operation regardless of the signal strength 120.

The comparison circuit 28 determines according to the result of determination 122 by the determinator 26 and the reception data 116 supplied from the demodulator 22 whether the corresponding received radio wave is destined for the present apparatus 10. Only when the result of determination 122 indicates the continuation of the receiving operation, the comparison circuit 28 of the present embodiment may perform such determination. The comparison circuit 28 takes, for example, part of the reception data 116, e.g., a portion indicative of information about a network address or the like as data intended for comparison and compares it with predetermined comparison data having information about the present apparatus, thereby making it possible to determine that the corresponding radio wave is destined for the present apparatus 10 where they coincide with each other. The comparison circuit 28 may preferably store such predetermined comparison data therein in advance.

When the received radio wave is destined for the present apparatus 10, the comparison circuit 28 outputs reception processing data 124 based on the reception data 116. When other than it, the comparison circuit 28 may stop the output of the reception processing data 124, output a notice 126 indicative of the stop of the receiving operation and supply it to the control circuit 16 via the input/output circuit 30.

The input/output circuit 30 may be a host interface having the function of mutually transmitting digital data between the transmitter-receiver 14 and the control circuit 16. In the present embodiment, the input/output circuit 30 is connected to an input/output circuit 40 in the control circuit 16 via the connecting lines 102 and 104 and swaps the digital data and control signals with the input/output circuit 40.

When, for example, the present apparatus 10 performs its receiving operation, the input/output circuit 30 notifies a control signal 128 indicative of a reception instruction notified from the control circuit 16 via the connecting line 102 to the RF circuit 20, the demodulator 22, the RSSI detector 24, the determinator 26, the comparison circuit 28 and the modulator 32 according to the reception instruction. Further, the input/output circuit 30 supplies the reception processing data 124 supplied from the comparison circuit 28 to the control circuit 16 via the connecting line 104.

On the other hand, when the present apparatus 10 performs it transmitting operation, the input/output circuit 30 notifies a control signal 130 indicative of a transmission instruction notified from the control circuit 16 via the connecting line 102 to the RF circuit 20 and the modulator 32 according to the transmission instruction. Then, the input/output circuit 30 receives therein transmission data from the control circuit 16 via the connecting line 102 and supplies the transmission data 136 to the modulator 32.

The modulator 32 effects modulation processing on the digital transmission data 136 supplied via the input/output circuit 30 from the control circuit 16, particularly in the present embodiment, performs digital-to-analog conversion on the same to produce analog transmission data 138, followed by supply to the RF circuit 20.

The measurement unit 34 measures the time taken until the demodulator 22 outputs accurate demodulated data 116, i.e., the time required to stabilize the reception data 116. The measurement unit 34 outputs the result of measurement 132 indicating the instability of the reception data before the stable time elapses and indicating the stability of the reception data after the stable time is reached, and supplies it to the determinator 26.

The measurement unit 34 may be configured including, for example, an up counter for counting up in sync with the demodulation clocks 118 supplied from the demodulator 22 to produce a Carry. When the number counted by the present counter reaches a predetermined target count value n (where n: integer), the measurement unit 34 determines that the stable time has been reached, and outputs the result of measurement 132 indicative of the stability of the reception data. The measurement unit 34 may preferably hold a predetermined target count value set in such a manner that the stable time can elapse sufficiently. When the instruction for the halt of the receiving operation is received from the control circuit 16, the measurement unit 34 may initialize the counter to bring the counted number to 0.

The control circuit 16 has the function of controlling and generally managing the operation of the whole present apparatus. The control circuit 16 supplies both a control signal indicative of transmitting/receiving operations and transmission data to the transmitter-receiver 14 via the connecting line 102 and receives a receiving operation stop notice and reception processing data from the transmitter-receiver 14 via the connecting line 104. When the receiving operation stop notice is accepted from the determinator 26 or the comparison circuit 28 in the transmitter-receiver 14, the control circuit 16 may supply the control signal 102 for instructing the stop of the receiving operation over the whole transmitter-receiver 14 to the transmitter-receiver 14.

In the present embodiment, the control circuit 16 is configured including the input/output circuit 40, a controller 42 and a timer 44 as shown in FIG. 1 by way of example.

The input/output circuit 40 may be a host interface having the function of mutually transmitting digital data between the transmitter-receiver 14 and the control circuit 16. In the present embodiment, the input/output circuit 40 is connected to the input/output circuit 30 in the transmitter-receiver 14 via the connecting lines 102 and 104 and swaps the digital data and control signals with the input/output circuit 30.

The controller 42 supplies a control signal 140 indicative of a setting time such as a reception start time or the like to the timer 44 to control it. Further, the controller 42 supplies a control signal 144 for instructing the receiving or transmitting operation of the present apparatus 10 to the transmitter-receiver 14 via the input/output circuit 40 in accordance with a setting time expiration notice 142 supplied from the timer 44.

Upon the receiving operation, the controller 42 controls the present apparatus 10 in response to reception processing data 146 sent from the transmitter-receiver 14 via the input/output circuit 40 to execute the storage and analysis of the reception processing data 146 and its instruction. Upon the transmitting operation, the controller 42 sets or builds up transmission data 144 indicative of a desire for transmission and supplies the same to the transmitter-receiver 14 via the input/output circuit 40.

In response to the control signal 140 indicative of the setting time sent from the controller 42, the timer 44 counts the setting time and supplies the setting time expiration notice 142 to the controller 42 when count expiration is reached.

In the present embodiment, the timer 44 in the control circuit 16 first counts a reception start time set by the controller 42 and notifies a setting time expiration notice 142 to the controller 42 when the setting time is expired.

The controller 42 issues a reception start instruction in accordance with the setting time expiration notice 142 and supplies a control signal 144 for instructing the reception start to the transmitter-receiver 14 via the input/output circuit 40 (S202).

Next, a control signal 128 for instructing the receiving operation is supplied from the input/output circuit 30 to each section in accordance with the reception start instruction sent from the control circuit 16 to start the receiving operation of the present apparatus 10. Thus, the present apparatus 10 is brought into a state capable of receiving a radio wave. For example, a predetermined radio wave is received by the antenna 12 and an RF signal based on the radio wave is inputted to the RF circuit 20 (S204).

At this time, the RF circuit 20 converts the RF signal into analog form to produce analog reception data 112 and 114.

The reception data 112 is supplied to the demodulator 22, where it is subjected to demodulation processing such as analog-to-digital conversion to produce digital reception data 116. The reception data 116 is supplied to the comparison circuit 28 together with demodulation clocks 118 outputted from the demodulator 22.

The reception data 114 is supplied to the RSSI detector 24, where a signal strength based on the data 114 is detected. The signal strength is analog-to-digital converted to produce digital data 120 indicative of the signal strength.

Figure 4:
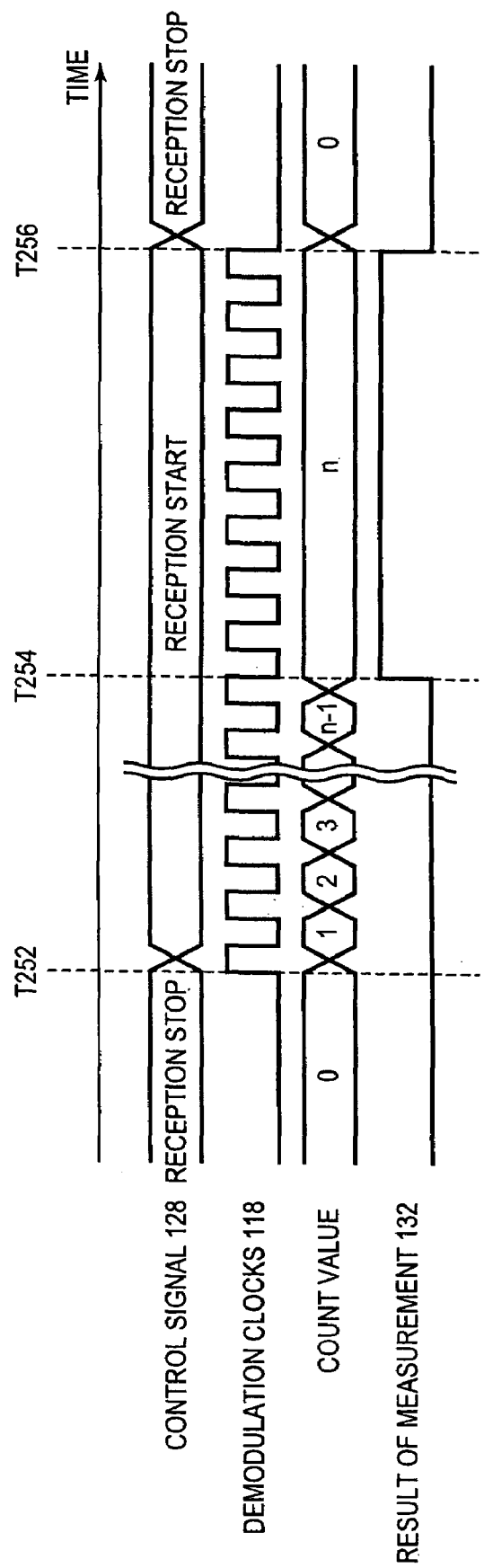
FIG. 4 is a timing chart for describing a procedure of operations of a measurement unit in the data transmitting/receiving apparatus shown in FIG. 1.

Meanwhile, the demodulation clocks 118 outputted from the demodulator 22 are supplied even to the measurement unit 34. The measurement unit 34 is informed of the start of the receiving operation in accordance with the control signal 128 to count the demodulation clocks 118 and determines whether it reaches a predetermined target count value (S206). An example of the operation of the measurement unit 34 at Step S206 will be explained in conjunction with a timing chart shown in FIG. 4.

In the measurement unit 34, a count value is indicative of an initial value 0 during the period in which the control signal 128 indicative of the stop of reception is being supplied, and the result of measurement 132 indicative of the instability of reception data is supplied to the determinator 26.

Next, when a time T252 (FIG. 4) is reached, the measurement unit 34 is supplied with the control signal 128 indicative of the start of reception and supplied with the demodulation clocks 118 from the demodulator 22. Thus, since the stable time is not reached although the count value is counted up, the result of measurement 132 indicative of the instability of the reception data is supplied to the determinator 26.

When the count value of the measurement unit 34 reaches a predetermined target count value n (T254) (FIG. 4), the measurement unit 34 judges that the stable time has been reached. Then, the measurement unit 34 supplies the result of measurement 132 indicative of the stability of the reception data to the determinator 26 and thereafter the flowchart proceeds to Step S208. When the control signal 128 indicative of the stop of reception is supplied to the measurement unit 34 again (T256) (FIG. 4), the measurement unit 34 is not supplied with the demodulation clocks 118. Thus, the measurement unit 34 stops count-up of the count value and initializes the count value, followed by supply of the result of measurement 132 indicative of the instability of reception data to the determinator 26.

At Step S208, the result of measurement 132 indicative of the instability of reception data is supplied to the determinator 26. Therefore, the signal strength 120 is supplied to the determinator 26, where it is compared with a predetermined threshold value. It is thus determined whether the receiving operation of the present apparatus 10 should be continued or stopped.

When it is found from the result of determination at Step S208 that the receiving operation should be continued, the flowchart proceeds to Step S210, where the result of determination 122 indicating that the receiving operation should be continued is notified to the comparison circuit 28, where the reception data is compared with it. On the other hand, when it is determined that the receiving operation should be stopped, the result of determination 122 indicating that the receiving operation should be stopped is notified to the comparison circuit 28. Therefore, the flowchart thereafter returns to Step. S202 without performing comparison processing.

At Step S210, the reception data 116, the demodulation clocks 118 and the result of determination 122 indicating that the receiving operation should be continued, are supplied to the comparison circuit 28, where comparison processing is done. When data intended for comparison at the reception data 116 and predetermined comparison data coincide with each other, reception processing data 124 based on the reception data 116 is supplied to the control circuit 16 via the input/output circuit 30. When they are found not to coincide with each other, the flowchart returns to Step S202 without outputting the reception processing data 124.

The control circuit 16 analyzes the reception processing data 124 to receive desired data and determines whether the reception is completed (S216).

When it is judged from the result of determination at S216 that the reception has not yet been completed, the processing of reception data at Step S214 is continued. When, however, the completion of reception is detected, the flowchart proceeds to Step S218, where a reception stop instruction is issued and notified to the transmitter-receiver 14 via the connecting line 102.

The reception stop instruction 102 is supplied to each section as the control signal 128 by the input/output circuit 30. The reception stop instruction 102 is supplied to, for example, the determinator 26 to stop the determination of the signal strength. Further, the reception stop instruction 102 is supplied to the comparison circuit 28 to stop the comparison processing and the output of the reception processing data 124.

Figure 5:
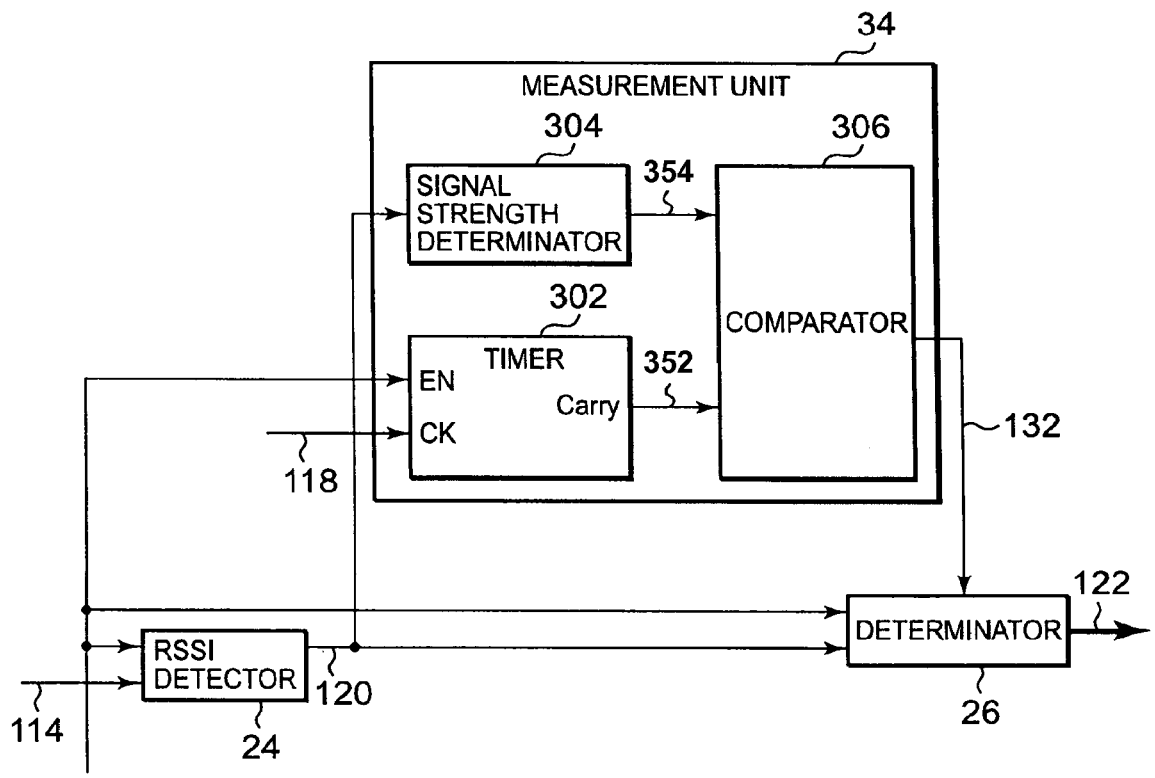
FIG. 5 is a block diagram illustrating an example of the measurement unit of the data transmitting/receiving apparatus shown in FIG. 1.

In the data transmitting/receiving apparatus 10 according to the present embodiment, the measurement unit 34 of the transmitter-receiver 14 may be configured including a timer 302, a signal strength determinator 304 and a comparator 306 as shown in FIG. 5 by way of example.

The timer 302 may be, for example, an up counter which is operated in accordance with the control signal 128 and counts up in sync with the demodulation clocks 118. The timer 302 notifies a count value 352 to the comparator 306.

The signal strength determinator 304 calculates a stable time according to the signal strength 120 supplied from the RSSI detector 24, and obtains a new target count value 354, based on the stable time and notifies it to the comparator 306.

Figure 6:
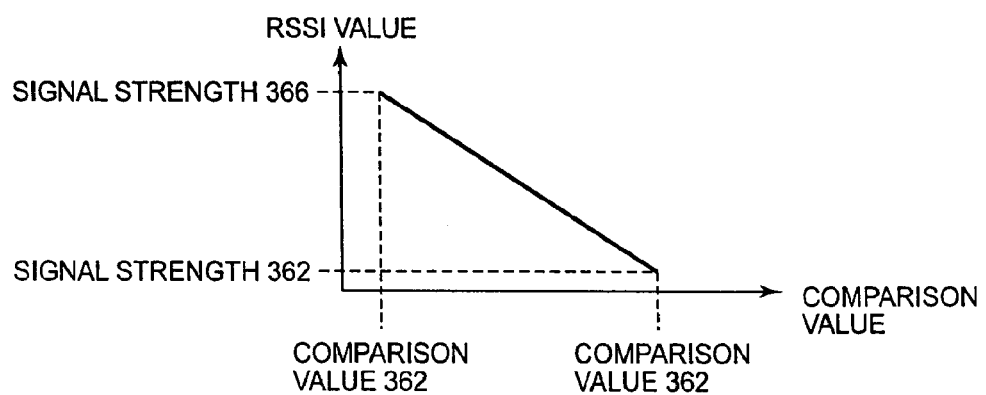
FIG. 6 is a graph for describing conditions for calculating a new target count value generated by a signal strength determinator in the measurement unit shown in FIG. 5.

As shown in FIG. 6 by way of example, the signal strength determinator 304 obtains a low comparison value 366 under a value 362 at which the signal strength 120 is low, and obtains a high comparison value 368 under a value 364 at which the signal strength 120 is high. The resultant comparison value may be set as a new target count value 354.

The comparator 306 compares the count value 352 and the new target count value 354. The comparator 306 produces the result of measurement 132 depending upon the result of comparison and supplies it to the determinator 26. When, for example, the count value 352 is larger than the new target count value 354, the comparator 306 of the present embodiment may produce the result of measurement 132 indicative of the stability of reception data. When the count value 352 reaches a predetermined target count value n even though the count value 352 does not exceed the new target count value 354, the comparator 306 produces the result of measurement 132 indicative of the stability of reception data.

Figure 7:
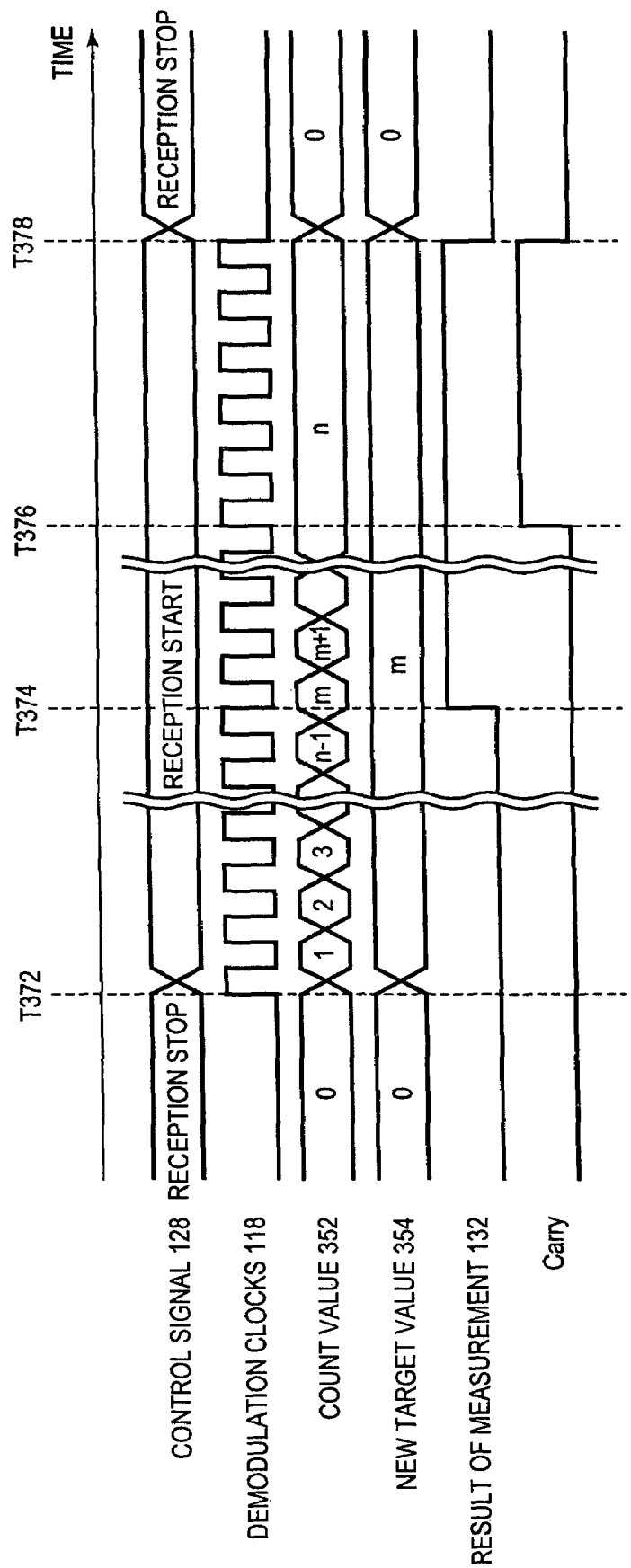
FIG. 7 is a timing chart for describing a procedure of operations of the measurement unit shown in FIG. 5.

An example illustrative of the operation of such a measurement unit 34 of the data transmitting/receiving apparatus 10 according to the present embodiment will next be explained with reference to a timing chart shown in FIG. 7.

In the measurement unit 34, a value 352 counted by the timer 302 is indicative of an initial value 0 during the period in which the control signal 128 indicative of the stop of reception is being supplied, and the result of measurement 132 indicative of the instability of reception data is supplied to the determinator 26.

Next, when a time T372 is reached, the measurement unit 34 is supplied with a control signal 128 indicative of the start of reception and supplied with demodulation clocks 118 from the demodulator 22. Thus, since the stable time is not reached although the count value 352 is counted up, the result of measurement 132 indicative of the instability of the reception data is supplied to the determinator 26.

The signal strength determinator 304 analyzes a signal strength 120 and calculates a new target count value 354 indicative of m (where m: integer, and m<n), and supplies it to the comparator 306.

Since the count value 352 reaches a new target count value 354 indicative of m at a time T374 before a time T376 at which the count value 352 reaches a predetermined target count value n, the comparator 306 determines that the stable time has been reached, and supplies the result of measurement 132 indicative of the stability of reception data to the determinator 26.

When the measurement unit 34 is supplied with the control signal 128 indicative of the stop of reception again (T378), the measurement unit 34 is not supplied with the demodulation clocks 118 and stops count-up of the count value to initialize the count value, after which the result of measurement 132 indicative of the instability of reception data is supplied to the determinator 26.

The data transmitting/receiving apparatus 10 according to the present invention can be applied to all wireless communication apparatuses each of which observes a signal strength of reception data.

While the preferred forms of the present invention have been described, it is to be understood that modifications will be apparent to those skilled in the art without departing from the spirit of the invention. The scope of the invention is to be determined solely by the following claims.

What is claimed is:

1. A data transmitting/receiving apparatus comprising:
   transmitting/receiving means for transmitting and receiving desired reception data and transmission data by radio waves; and
   control means for controlling transmission/reception of the reception data and the transmission data and performing reception processing on reception processing data based on the reception data,
   wherein the transmitting/receiving means includes determining means for determining based on a signal strength of the reception data whether a receiving operation should be continued or stopped and outputting a result of determination by the determining means,
   wherein the control means inputs the result of determination therein and controls the receiving operation so as to stop the receiving operation when the result of determination indicates a stop of the receiving operation,
   wherein the transmitting/receiving means includes measuring means for measuring a time required to make the reception data stable and outputting a result of measurement indicating stability of the reception data when the stable time elapses and indicating instability of the reception data when other than above, and
   wherein the determining means inputs the result of measurement therein and outputs the result of determination indicating a stop of the receiving operation regardless of the signal strength when the result of measurement indicates the instability of the reception data.

2. The data transmitting/receiving apparatus according to claim 1, wherein the transmitting/receiving means converts the received radio wave into analog form and effects demodulation processing thereon to produce the reception data,
   wherein the measuring means includes a counter for counting up in accordance with demodulation clocks for activating the demodulation processing, and
   wherein the counter outputs the result of measurement indicative of the stability of the reception data when a counted number of the demodulation clocks reaches a predetermined target count value and initializes the counted number when an instruction for stopping the receiving operation is accepted from the control means.

3. The data transmitting/receiving apparatus according to claim 2, wherein the counter holds in advance the predetermined target count value at which the stable time elapses sufficiently.

4. The data transmitting/receiving apparatus according to claim 3, wherein the measuring means includes:
   signal strength determining means for counting a new target count value, based on the signal strength, and
   comparing means for comparing the number counted by the counter and the new target count value and outputting the result of measurement according to the result of comparison thereby, and
   wherein the comparing means outputs the result of measurement indicative of the stability of reception data when the counted number reaches either of the predetermined target count value and the new target count value.

5. The data transmitting/receiving apparatus according to claim 4, wherein the signal strength determining means calculates the new target count value low when the signal strength is low and calculates the new target count value high when the signal strength is high.

6. A method for controlling a data transmitting/receiving apparatus comprising a transmitting/receiving section for transmitting and receiving desired reception data and transmission data by radio waves, and a control section for controlling transmission/reception of the reception data and the transmission data and performing reception processing on reception processing data based on the reception data, said method comprising:
 a determining step for causing the transmitting/receiving section to determine based on a signal strength of the reception data whether a receiving operation should be continued or stopped and to output a result of determination thereby;
 a first step for inputting the result of determination to the control section and causing the control section to control the receiving operation in such a way as to stop the receiving operation when the result of determination indicates a stop of the receiving operation; and
 a measuring step for causing the transmitting/receiving section to measure a time required to make the reception data stable and to output a result of measurement indicating stability of the reception data when the stable time elapses and indicating instability of the reception data when other than above,
 wherein in the determining step, the result of measurement is inputted and the result of determination indicating a stop of the receiving operation is outputted regardless of the signal strength when the result of measurement indicates the instability of the reception data.

7. The method according to claim 6, further including:
 a second step for causing the transmitting/receiving section to convert the received radio wave into analog form and to effect demodulation processing thereon thereby to produce the reception data;
 a third step for causing a counter to count up in accordance with demodulation clocks for activating the demodulation processing in said measuring step,
 wherein in said third step, the result of measurement indicative of the stability of the reception data is outputted when a counted number of the demodulation clocks reaches a predetermined target count value and the counted number is initialized when an instruction for stopping the receiving operation is accepted from the control section.

8. The method according to claim 7, wherein the predetermined target count value at which the stable time elapses sufficiently is held in the counter in advance.

9. The method according to claim 8, wherein the measuring step includes:
 a signal strength determining step for calculating a new target count value, based on the signal strength; and
 a comparing step for comparing the number counted by the counter and the new target count value and outputting the result of measurement according to the result of comparison thereby,
 wherein in the comparing step, the result of measurement indicative of the stability of reception data is outputted when the counted number reaches either of the predetermined target count value and the new target count value.

10. The method according to claim 9, wherein in the signal strength determining step, the new target count value low when the signal strength is low is calculated, and the new target count value high when the signal strength is high is calculated.

11. A control method for a data transmitting/receiving apparatus comprising:
 performing counting in sync with a clock signal supplied from a demodulator when a control signal indicative of a reception start is inputted, to provide a count value; and
 stopping a comparison of the count value with a received signal until the count value reaches a predetermined value, to prevent unstable operation of the data transmitting/receiving apparatus.

* * * * *